(12) United States Patent
Haffner et al.

(10) Patent No.: US 8,713,932 B2
(45) Date of Patent: May 6, 2014

(54) HYDRAULIC MODULE

(75) Inventors: Martin Haffner, Friedrichshafen (DE); Udo Brehmer, Konstanz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 779 days.

(21) Appl. No.: 12/989,119

(22) PCT Filed: Apr. 28, 2009

(86) PCT No.: PCT/EP2009/055094
§ 371 (c)(1),
(2), (4) Date: Oct. 22, 2010

(87) PCT Pub. No.: WO2009/146983
PCT Pub. Date: Dec. 10, 2009

(65) Prior Publication Data
US 2011/0061524 A1     Mar. 17, 2011

(30) Foreign Application Priority Data

Jun. 2, 2008 (DE) .......................... 10 2008 002 140

(51) Int. Cl.
*F16H 39/14* (2006.01)
(52) U.S. Cl.
USPC ............................................... 60/491; 92/57

(58) Field of Classification Search
USPC ................................... 60/491, 492; 92/56, 57
See application file for complete search history.

(56) References Cited

U.S. PATENT DOCUMENTS

| 2,981,068 A | * | 4/1961 | Foerster et al. | 60/491 |
| 3,834,164 A | | 9/1974 | Ritter | |
| 3,958,496 A | * | 5/1976 | Wallin | 91/506 |
| 4,422,367 A | * | 12/1983 | Berthold | 91/506 |
| 2004/0261408 A1 | | 12/2004 | Fleming et al. | |
| 2007/0277520 A1 | | 12/2007 | Gollner | |
| 2010/0192576 A1 | | 8/2010 | Legner | |

FOREIGN PATENT DOCUMENTS

| DE | 10 2006 025 347 B3 | 12/2007 |
| WO | 2009/047039 A1 | 4/2009 |

* cited by examiner

*Primary Examiner* — F. Daniel Lopez
(74) *Attorney, Agent, or Firm* — Davis & Bujold, PLLC; Michael J. Bujold

(57) ABSTRACT

A hydraulic module with two inclined-axis drive systems. The hydraulic module comprises a yoke (1) which, by virtue of a pin (5) that is in active connection with a piston (6), is pivoted about a horizontal pivot axis (4) so as to adjust the stroke volume of the two inclined-axis drive systems.

11 Claims, 2 Drawing Sheets

US 8,713,932 B2

HYDRAULIC MODULE

This application is a National Stage completion of PCT/EP2009/055094 filed Apr. 28, 2009, which claims priority from German patent application serial no. 10 2008 002 140.7 filed Jun. 2, 2008.

FIELD OF THE INVENTION

The invention concerns a hydraulic module.

BACKGROUND OF THE INVENTION

As disclosed in DE 10 2006 025 347 B3, hydraulic modules of the type concerned, in particular for hydrostatic-mechanical transmissions, comprise integrated inclined-axis drive systems in each case comprising a cylinder block with displacement elements that can move therein, which are mounted so that they can pivot on axis-parallel shafts, such that the cylinder blocks of the two inclined-axis drive systems are mounted with different pivoting angles in a common yoke and, to adjust the volume flow, they can be pivoted necessarily conjointly with the yoke by a servo system.

In DE 10 2006 025 347 B3 the servo adjustment system consists of two servo pistons that act upon the yoke. Exact adjustment of the yoke, in particular exact feedback for adjustment purposes, is difficult because of the tolerances involved.

SUMMARY OF THE INVENTION

The purpose of the present invention is to provide a hydraulic module characterized by a simple structure, which can be controlled accurately.

According to the invention, the hydraulic module comprises a yoke mounted to pivot about a pivot axis. By pivoting the yoke about the pivot axis the stroke volume of the inclined-axis drive systems can be varied. The yoke has a pin positioned between the two bearings carrying the yoke. The pin is connected integrally with the yoke or can be made as a separate component connected to the yoke in a fixed position.

The pin is in active connection with a piston so that translational movement of the piston moves the pin in such manner that the yoke is caused to pivot about its pivot axis.

In a further development of the invention the piston has an opening in which the pin engages. The end of the pin that engages in the piston is preferably ball-shaped, since this minimizes the frictional resistance between the piston and the pin. The pin is preferably positioned between the two inclined-axis drive systems. and the yoke can comprise a plate between the two inclined-axis drive systems which holds the pin.

The longitudinal axis of the piston is arranged perpendicularly to the pivot axis of the yoke, with the piston positioned between the bearings of the inclined-axis drive systems. This makes it possible, in a direct coaxial extension of the piston, to obtain information in a simple manner about the momentary displacement angle of the yoke and to adjust the yoke with precision by means of a control device.

In a further development of the invention, the hydraulic module comprises a plate, which on the one hand holds the bearing of the inclined-axis drive system and on the other hand has a bore for the piston. Furthermore, the bearings of the yoke are permanently connected to the plate.

BRIEF DESCRIPTION OF THE DRAWINGS

Other features emerge from the description of the figures, which show.

DETAILED DESCRIPTION OF THE PREFERRED EMBODIMENTS

FIG. 1

Figure 1:
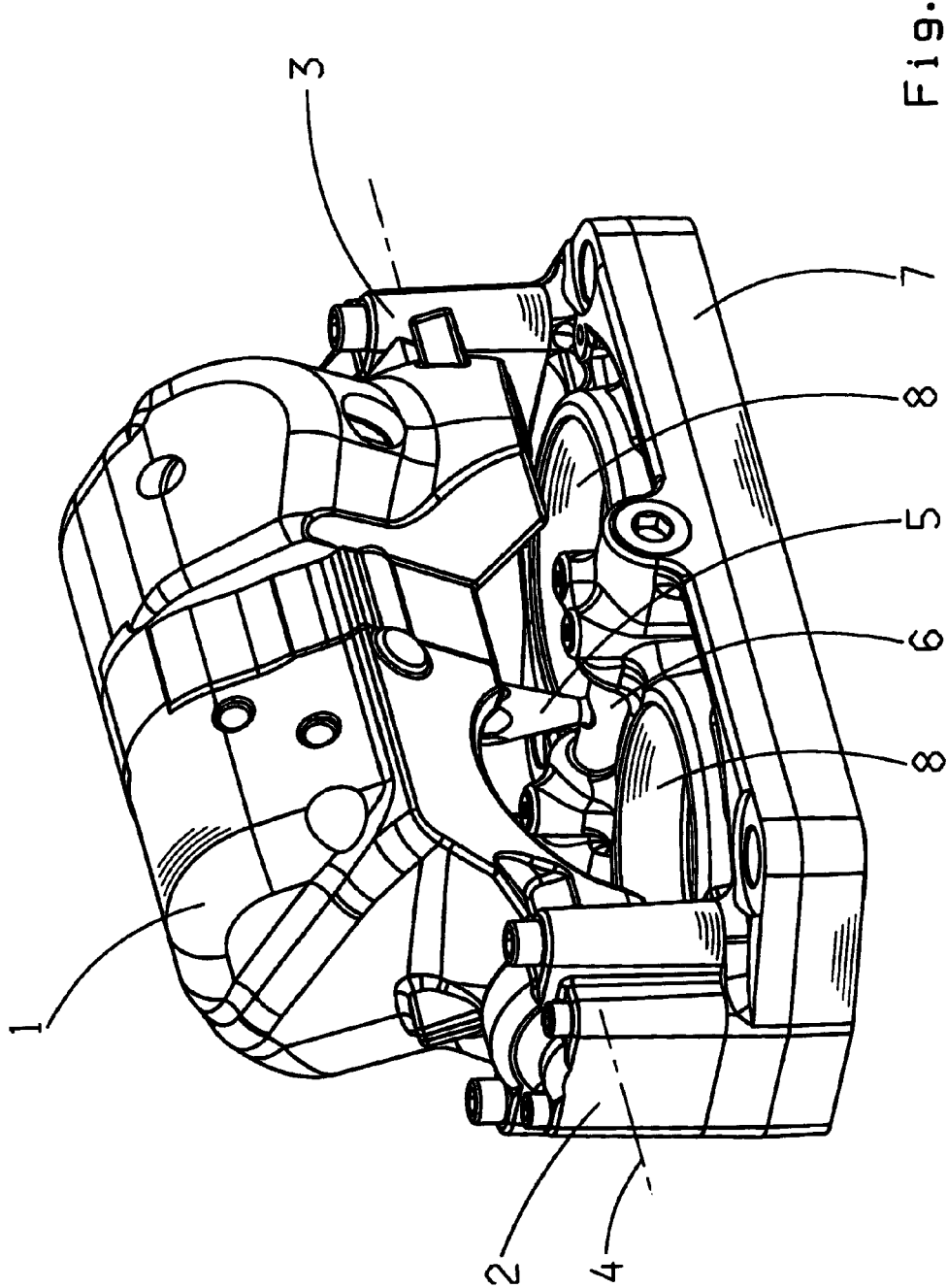
FIG. 1: Three-dimensional representation of part of the hydraulic module.
Figure 2:
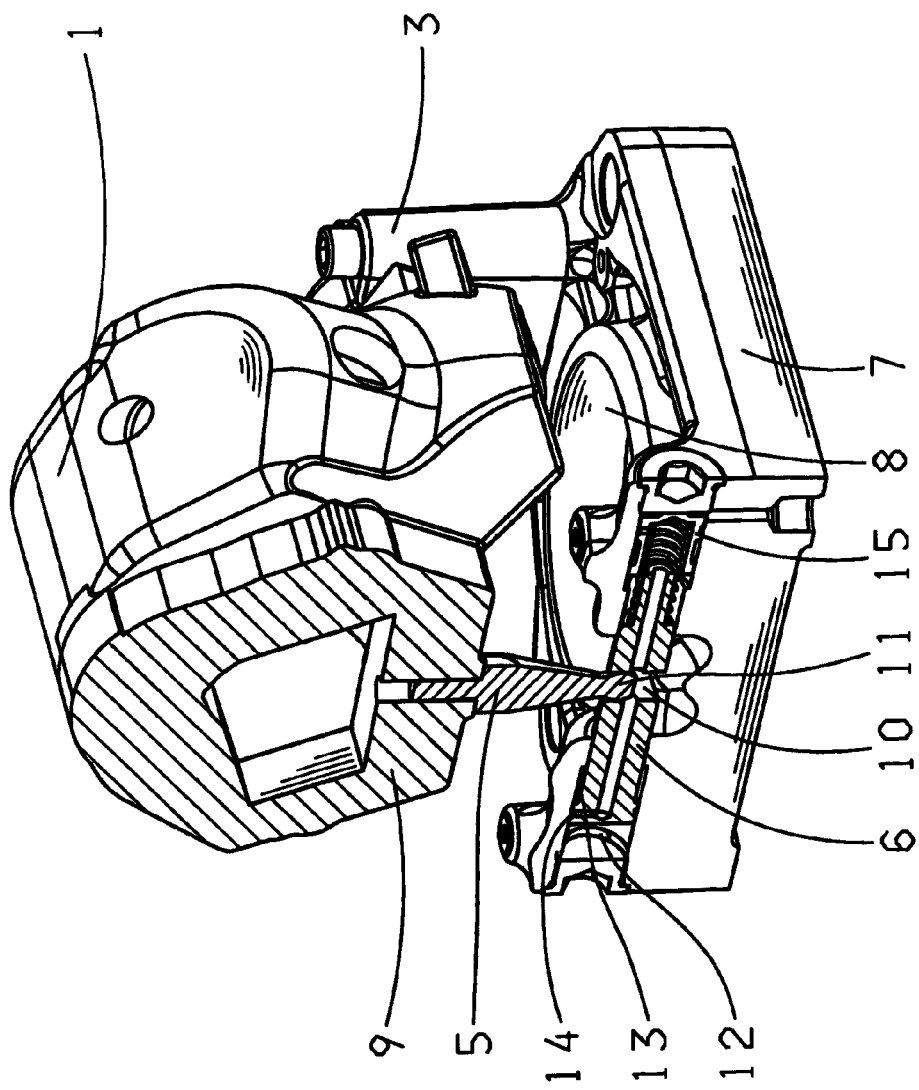
FIG. 2: Section through the three-dimensional representation shown in FIG. 1.

A yoke 1 is mounted to pivot on a first bearing 2 and a second bearing 3, about a pivot axis 4. In the yoke 1 are arranged inclined-axis drive systems as described in DE 10 2006 025 347 B3. Between the inclined-axis drive systems is a pin 5 that engages in a piston 6. The piston 6 is held in a plate 7 which carries the bearing 8 of the inclined-axis drive systems and is connected to the first bearing 2 and the second bearing 3.

FIG. 2

The yoke 1 comprises a plate 9, which is arranged between the inclined-axis drive systems and into which the pin 5 is screwed. The piston 6 has an opening 10 in which the ball-shaped end 11 of the pin 5 engages. Together with the plate 7 the piston 6 forms a first space 12 and a second space 13. When the first space 12 is pressurized by a pressure medium, the piston 6 moves in a first movement direction whereby, by means of the pin 5, the yoke 1 is pivoted in a first pivoting direction. When the second space 13 is pressurized, the piston 6 moves in a second movement direction such that the yoke 1 is pivoted by the pin 5 in a second pivoting direction. Between the first space 12 and the second space 13 the piston 6 has a groove 14, by which pressure medium leakage is drained away to the opening 10 to ensure precise working of the piston. At its end opposite the space 12 the piston has connection means 15 by virtue of which feedback or position determination of the piston 6 in hydraulic or electronic form is enabled.

The invention provides a hydraulic module which enables exact control of the stroke volume without taking up additional structural space.

Indexes
1 Yoke
2 First bearing
3 Second bearing
4 Pivot axis
5 Pin
6 Piston
7 Plate
8 Bearing
9 Plate
10 Opening
11 Ball-shaped end
12 First space
13 Second space
14 Groove
15 Connection means

The invention claimed is:

1. A hydraulic module comprising two inclined-axis drive systems integrated in the hydraulic module,
   each of the two inclined-axis drive systems comprising a cylinder block mounted in a common yoke (1),
   the yoke being mounted to pivot, via bearings (2, 3), about a pivot axis (4) to adjust displacement of the two inclined-axis drive systems, and the pivot axis extending between the bearings (2, 3), and the common yoke (1) having a pin (5), and the pin being fixed to the yoke such that the pin is immovable with respect to the yoke and is in active engagement with a piston (6), wherein the piston has opposite axial ends and a lateral opening that is located between the axial ends so that a remote end of the pin is received within the lateral opening of the piston and when the piston (6) moves in translation, the yoke (1) pivots about the pivot axis (4).

2. The hydraulic module according to claim 1, wherein the piston (6) and pin (5) are arranged between the two inclined-axis drive systems.

3. The hydraulic module according to claim 1, wherein the yoke (1) has a plate (9) which is connected to the pin (5) between the two inclined-axis drive systems.

4. The hydraulic module according to claim 3, wherein the plate (9) defines a plane and the piston slides along a longitudinal axis, and the plane is parallel to the longitudinal axis.

5. The hydraulic module according to claim 1, wherein the pin (5) has a ball-shaped end (11) which engages in the piston.

6. The hydraulic module according to claim 1, wherein the pin (5) is arranged perpendicularly to the pivot axis (4) of the yoke (1).

7. The hydraulic module according to claim 1, wherein the piston (6) is arranged in a plate (7) in which system bearings (8) of the two inclined-axis drive systems are located.

8. The hydraulic module according to claim 7, wherein the bearings (2, 3) of the yoke (1) are connected to the plate (7).

9. A hydraulic module comprising two inclined-axis drive systems integrated in the hydraulic module;

each of the two inclined-axis drive systems comprises a cylinder block that is mounted in a common yoke;

the yoke is pivotally supported on a plate by first and second bearings so as to pivot with respect to the plate about a pivot axis, and the plate comprises bearings of the inclined-axis drive systems;

the yoke has a pin that extends from the yoke, and the pin is immovable with respect to the yoke;

the plate supports the first and the second bearings and has a bore that receives a piston, and the piston slides within the bore along a longitudinal axis that is perpendicular to the pivot axis of the yoke; and a remote end of the pin that is remote from the yoke engages a lateral side of the piston such that when the piston slides along the longitudinal axis, the yoke is pivotally displaced about the pivot axis and an orientation between the cylinder blocks of the inclined-axis drive systems and the bearings of the inclined-axis drive systems is adjusted;

wherein the piston has opposite axial ends and a lateral opening that is located between the axial ends, the remote end at the pin is received within the lateral opening of the piston.

10. The hydraulic module according to claim 9, wherein the piston is arranged in the plate between the bearings of the inclined-axis drive systems.

11. The hydraulic module according to claim 9, wherein the pin is perpendicular to the pivot axis of the yoke.

* * * * *